Oct. 22, 1968            E. L. ROGERS            3,406,771
APPARATUS AND METHOD FOR WEIGHING RAILROAD CARS IN MOTION
Original Filed May 6, 1964            5 Sheets-Sheet 1
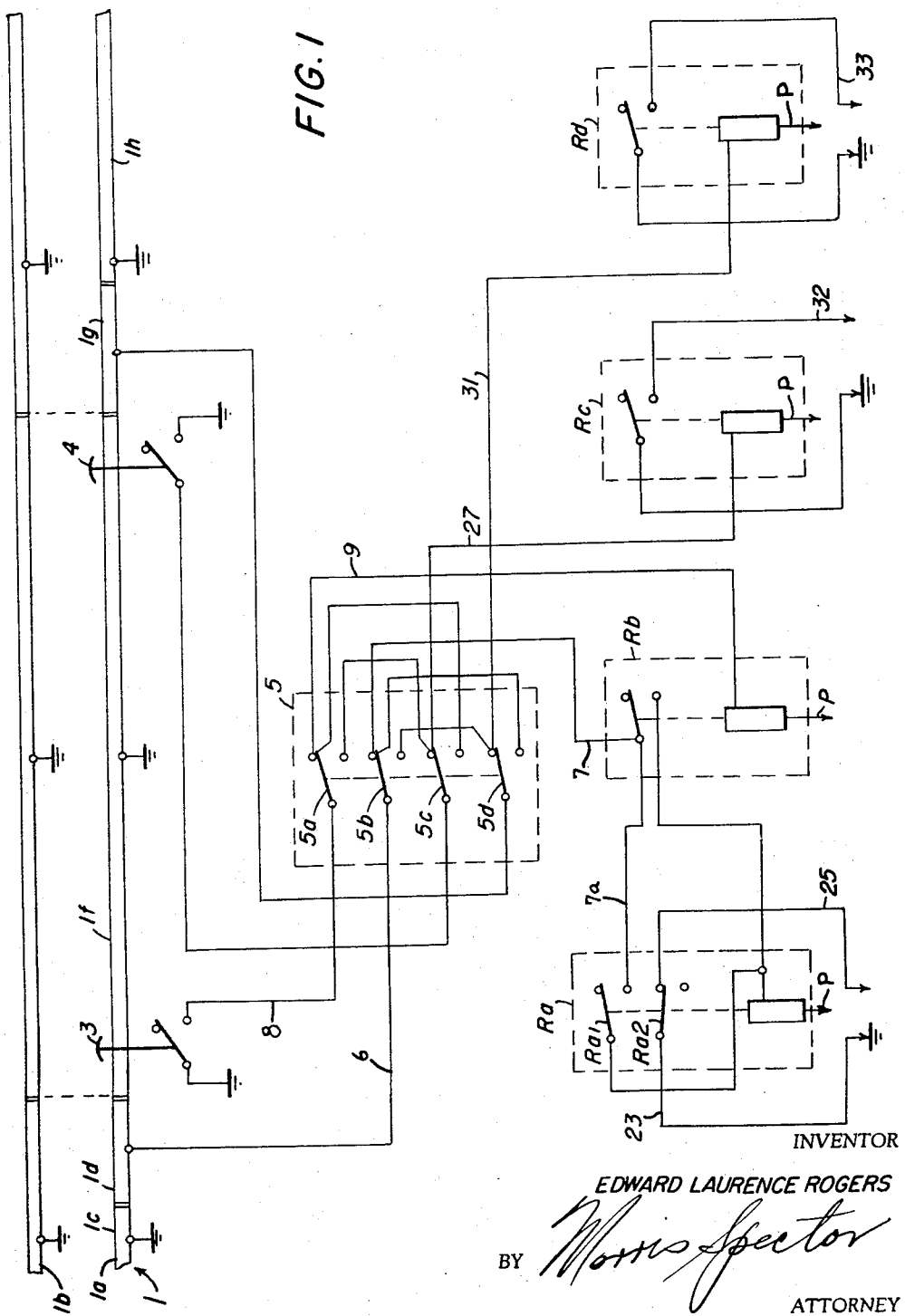
INVENTOR
EDWARD LAURENCE ROGERS
BY *Morris Spector*
ATTORNEY Oct. 22, 1968   E. L. ROGERS   3,406,771
APPARATUS AND METHOD FOR WEIGHING RAILROAD CARS IN MOTION
Original Filed May 6, 1964   5 Sheets-Sheet 2

INVENTOR
EDWARD LAURENCE ROGERS
BY Morris Spector
ATTORNEY

INVENTOR
EDWARD LAURENCE ROGERS
By Morris Spector
ATTORNEY

Oct. 22, 1968

E. L. ROGERS 3,406,771

APPARATUS AND METHOD FOR WEIGHING RAILROAD CARS IN MOTION

Original Filed May 6, 1964

INVENTOR
EDWARD LAURENCE ROGERS

BY *Morris Spector*
ATTORNEY

# United States Patent Office 3,406,771
Patented Oct. 22, 1968

3,406,771
APPARATUS AND METHOD FOR WEIGHING RAILROAD CARS IN MOTION
Edward Laurence Rogers, Chicago, Ill., assignor, by mesne assignments, to Railroad Machinery Development Corporation, a corporation of Ohio
Continuation of application Ser. No. 365,470, May 6, 1964. This application Oct. 22, 1965, Ser. No. 500,982
25 Claims. (Cl. 177—1)

ABSTRACT OF THE DISCLOSURE

Apparatus for rapid weighing of each of a series of moving railroad cars and quickly reducing errors caused by vibration, and making a record of the respective car weights, said record also indicating which cars were overspeeding as they moved across the weigh rail, so that the recordings of the weights of the cars not overspeeding may be attributed to the proper cars of the series.

---

Figure 1A:
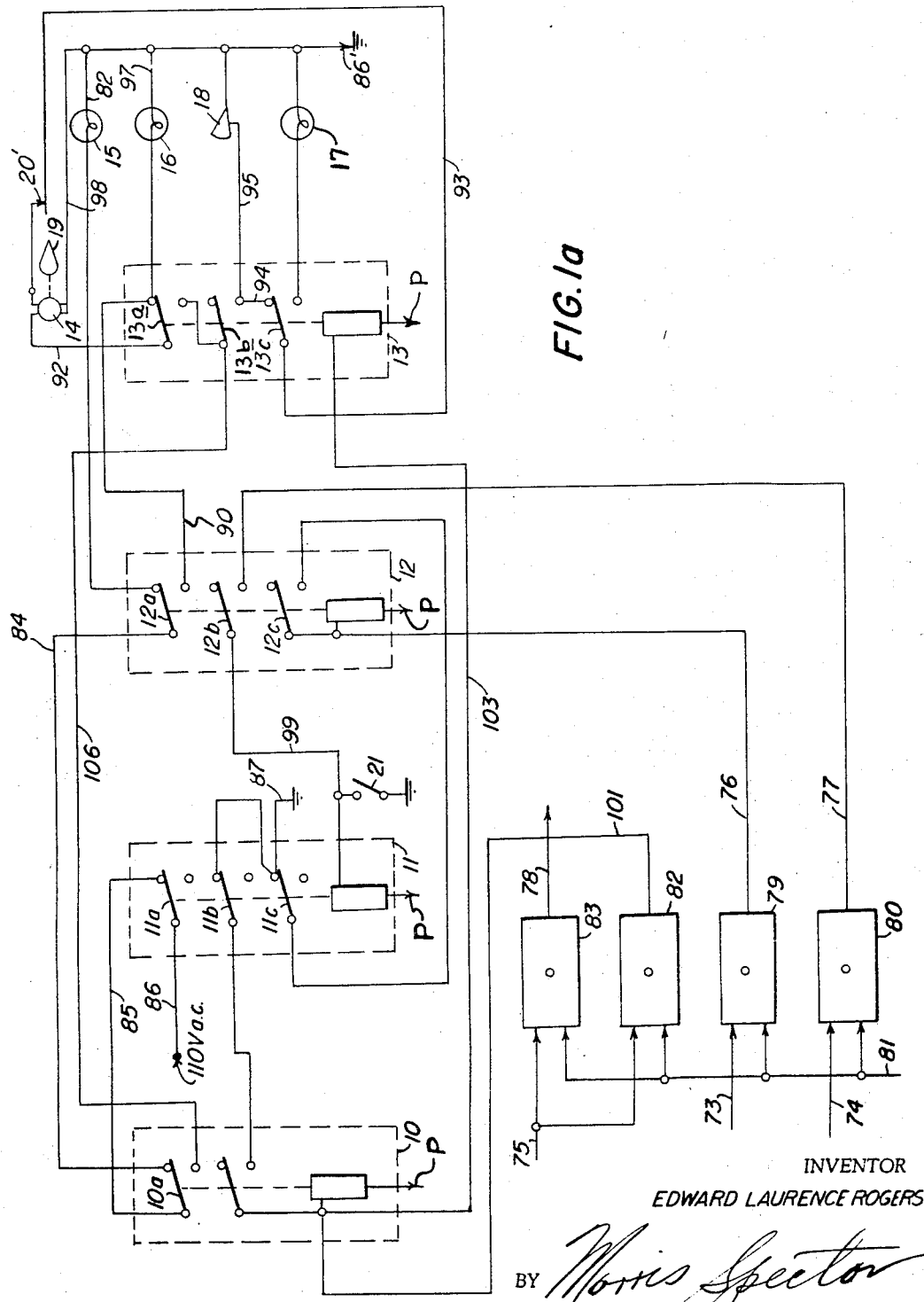

This application is a continuation of my pending application Ser. No. 365,470 filed May 6, 1964, and now abandoned, which relates to a method of weighing objects as they move past a weighing station, particularly vehicles.

Moving railroad freight cars are frequently weighed by two draft weighing, that is, by weighing each truck of a car separately. It is an object of the present invention to provide a simple two draft weighing system applicable to the weighing of railroad cars having trucks of any number of axles even though the successive railroad cars may have trucks of different numbers of axles.

It is a further object of this invention to provide a system that indicates which vehicle, if any, of a series being weighed, was moving too fast for accurate weighing at the time it was being weighed. Thus the speed of the cars of a train moving across the scale may be maintained at its optimum value with the knowledge that if that value is momentarily increased, the operator will be apprised as to which car or cars require re-weighing.

A still further object of this invention is to provide a control system for weighing railroad cars in motion wherein a signal is given to indicate when the maximum train speed for accurate weighing is being approached, so that the operator can take the necessary steps to assure no further increase in speed. This reduces the likelihood of having to reweigh a railroad car because of overspeed and permits weighing operations at very close to the maximum accurate weighing speed.

A further object of this invention is to provide a time delay, preferably a fixed time delay, from the instant the car to be weighed enters the scale until the time when the weighing operation is commenced. This allows a controlled amount of time for damping of vibrations that were mechanically or otherwise caused by the movement of the car weigh rail.

A still further object of this invention is to quickly minimize the effects on the weighing apparatus of high frequency oscillations caused by the object to be weighed as it moves onto or across the weigh rail.

It is a still further object of this invention to weigh the railroad car by integrating or averaging the weight for an accurately measured period of time, which may be of the order of two tenths of one second. This tends to average out errors due to vibrations or other causes.

In accordance with the preferred embodiment of the present invention the weighing is ultimately determined by measuring an electrical potential that should be proportionate to the weight on the weigh rail. A number of strain gauges are actuated by the weights on the weigh rail or rails. The gauges may be connected in any manner. One standard manner is a balanced Wheatstone Bridge that is unbalanced by the weight moving onto the weigh rails, and the voltage between opposite terminals of the Wheatstone Bridge is proportionate to that weight. This voltage is first amplified and then filtered through a low pass filter to filter out the high frequency oscillation and to attenuate the low frequency oscillations. I have found that by filtering out the high frequency impulses in the voltage wave of the load cell, before that voltage is converted to a frequency modulated voltage, most of the errors due to vibrations are eliminated. The filtered voltage goes to a voltage to frequency converter that produces a pulse train of a frequency proportionate to the weight on the weigh rail. This frequency is in one instance 50,000 cycles per second for every 100,000 lbs. on the weigh rail. This pulse train is fed to a gate amplifier for a fixed time controlled by a digital counter. That pulse count may be displayed visually by the visual counter. The counter controls a printer which prints the weight when a print command is issued, all as known in the art.

Figure 2:
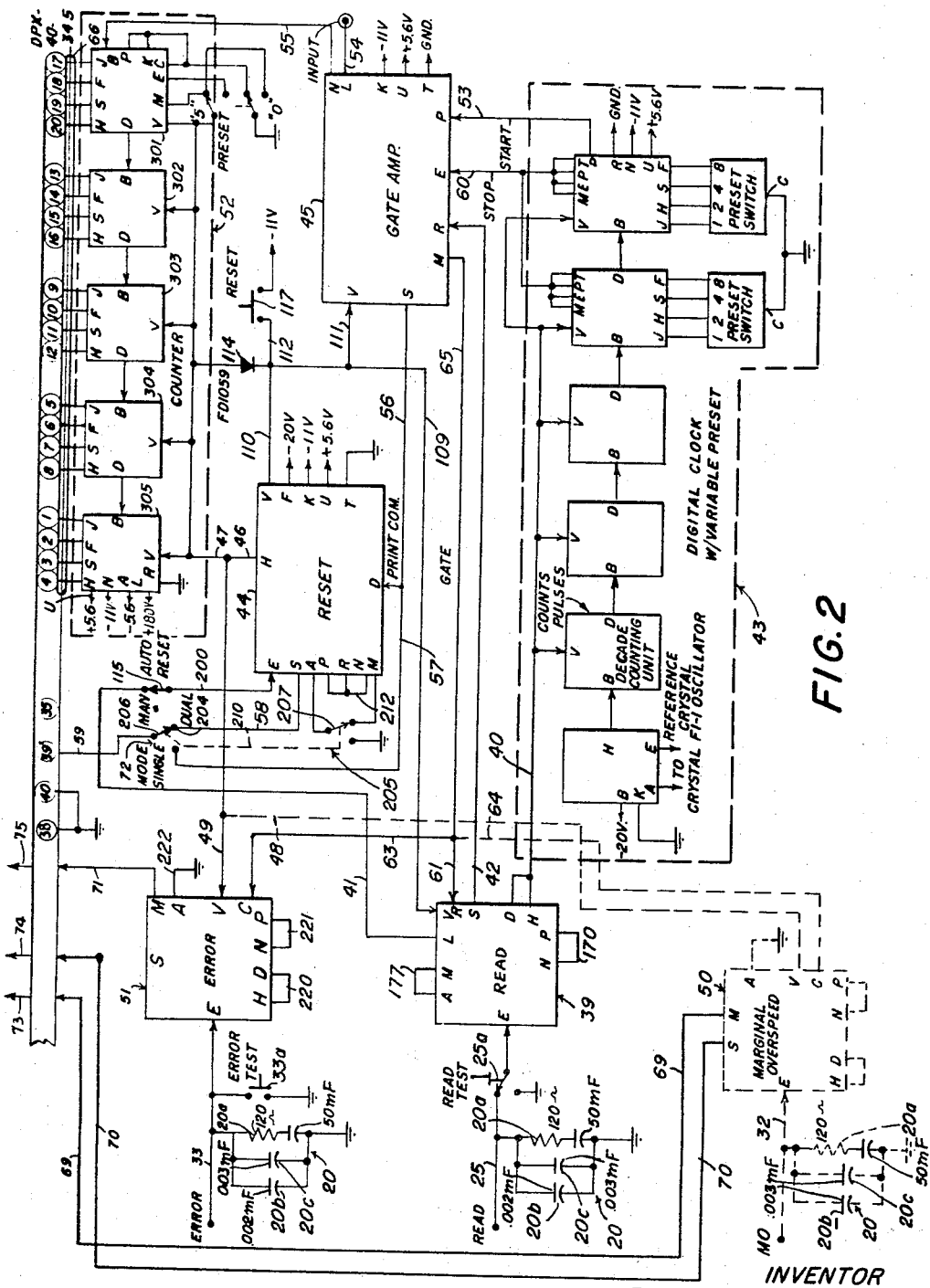
Figure 3:
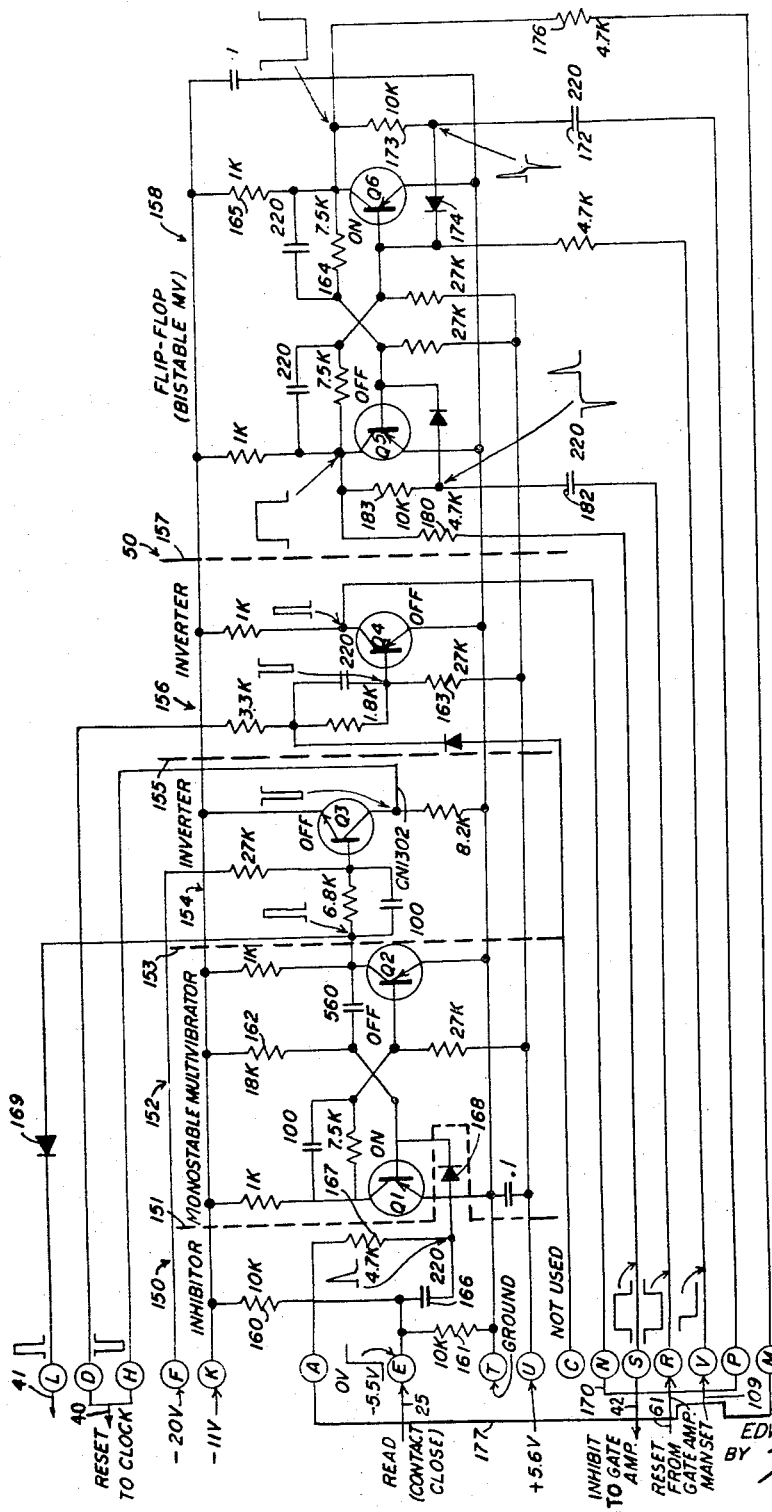
Figure 4:
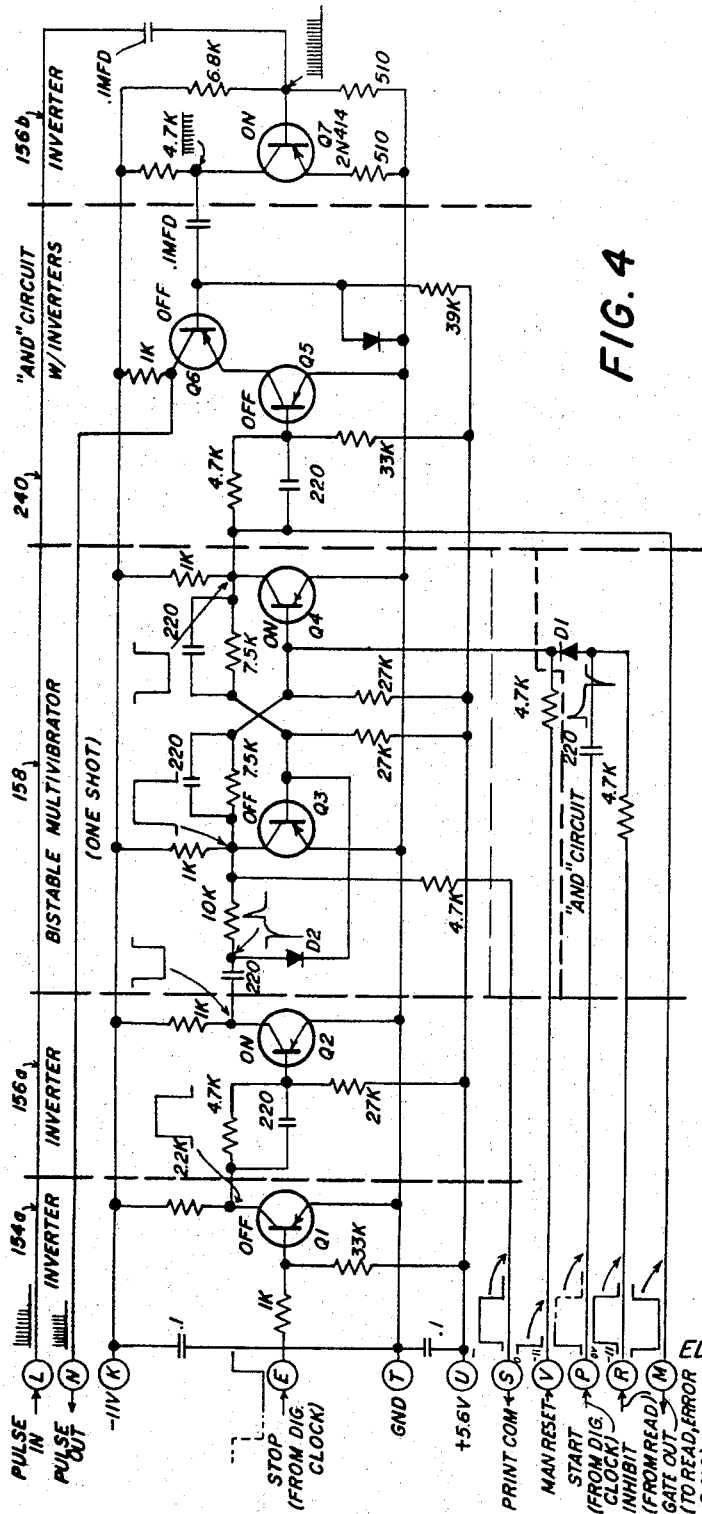

In the drawing:
FIG. 1 is a diagrammatic representation of the track controlled system;
FIG. 1a is an overspeed and marginal overspeed control circuit;
FIG. 2 is a chassis schematic layout;
FIG. 3 is a schematic diagram of a logic card for the "read" computing unit; and
FIG. 4 is a circuit similar to FIG. 3 for the gate amplifier.

Reference may now be had more particularly to FIG. 1 that outlines an electric system that triggers the circuitry for weighing railroad cars that are in motion and may even be coupled together. The system utilizes the fact that on the trucks of railroad freight cars electrical continuity exists from each wheel to its axle and thence to the other wheels of the same truck, and also to all of the wheels of the same car, and also through the car couplers electrical continuity is extended between all of the wheels of the train. This is a standard practice.

A length of railroad track is 1, its two track rails being indicated by 1a and 1b. The track rail 1a consists of an approach track rail section 1c, an electrically insulated track rail 1d, a weigh bridge rail section 1f, another electrically insulated track rail 1g, and an exit rail 1h. All of the rails are grounded except the two insulated rails 1d and 1g. The opposite track 1b is the same as the track 1a except that the track rails opposite 1d and 1g need not be insulated, and need be separated only from the weigh rail. The weigh bridge rail section 1f is separated from the rest of the track by a very short gap to permit weighing action in a manner known in the art.

The weigh bridge rail 1f has track switches 3 and 4 near its opposite ends. These switches are normally open and are adapted to be closed by the movement of a wheel over the adjacent part of the weigh bridge. A manually operated directional switch 5 is provided. This switch is in the position shown if the apparatus is to weigh cars approaching from left to right as seen in FIG. 1, so that 1c is the approach rail and 1h is the exit rail. The switch is moved to its opposite position when the apparatus is to weigh railroad cars moving from right to left, so that 1h becomes the approach section and 1c becomes the exit section. There is also provided an electro-magnetic read command relay Ra, an electro-magnetic engine print-out eliminator relay Rb, an electro-magnetic marginal overspeed relay Rc, and an electro-magnetic error overspeed relay Rd.

An explanation will now be given of the functions of the apparatus thus far described.

Assume that a train of coupled railroad cars is approaching from left to right on track 1. When a wheel reaches the track rail 1d, it grounds the track section 1d from a wheel on the same or different axle on the truck. This grounds the conductor 6 and through the switch blade 5b grounds conductors 7 and 7a. When that foremost wheel rolls onto the weigh bridge 1f, it operates the track switch 3 and through that switch places ground upon the conductor 8 and one end of the winding of relay Rb. The opposite end of this winding is connected to the ungrounded end of the grounded source of power P. The relay Rb operates. If there is another wheel on the insulated track section 1d, that wheel maintains the ground potential on 7, which is extended through the operated contact of the relay Rb to complete an operating circuit for the winding of the relay Ra. That relay operates and at its contact Ra1 and conductor 7a establishes a holding circuit for itself to ground on the conductor 7. It is thus apparent that the read command relay Ra operates upon operation of the switch 3 only if at that time there is a wheel on the insulated track section 1d, and then it remains operated so long as there continues to be some wheel on the insulated track section 1d, even after the switch 3 has been released. If, at the time the switch 3 is closed, there is no wheel on the insulated track rail 1d, the relay Ra does not operate. This condition prevails when the distance between the wheel that operates the switch 3 and the next succeeding wheel of the train is at a distance from the switch 3 greater than the distance between the switch 3 and the far end of the approach rail section 1d. This distance is made more than the maximum distance between centers of adjacent wheels of a truck of a standard railroad car but less than the minimum distance between adjacent wheels of a standard locomotive. It is also less than the minimum center to center distance between the closest wheels of adjacent coupled together standard freight cars.

In the illustration shown, each insulated track 1d and 1g is 5 ft. 10 inches long. This is the maximum center to center distance between adjacent axles of a truck of a standard American commercial freight car. The minimum center to center distance between adjacent axles of adjacent cars is 7 ft. The minimum center to center distance between adjacent wheels of a four axle locomotive is 8 ft. The switch 3 is located to be operated by a wheel when the wheel center is 10 inches from the adjacent end of the weigh bridge 1f. Therefore, when a train is moving from left to right and a freight car truck actuates the switch 3, there will always be another wheel of the truck on the insulated track section 1d, which will cause the operation of the read command relay Ra1, but when a wheel of a four axle locomotive operates the switch 3 there will not be another wheel on the insulated track rail 1d and the read command relay Ra will not operate. This arrangement therefore differentiates between railroad freight cars and certain types of locomotives, namely the four axle type, so that those types of locomotives do not cause operation of the read command relay.

The operation of the relay Ra is preparatory for the weighing operations which are initiated upon the subsequent release of that relay as will be more fully explained. The holding circuit for the relay Ra, as previously described, extends through the contact Ra1 thereof, the conductors 7a, 7 and conductor 6, to ground on the insulated track section 1d which persists until the last wheel on the insulated track section 1d leaves that section and rolls onto the weigh bridge. When the ground on conductor 6 is removed, the read command relay Ra releases, and at its contact Ra2 restores ground potential on conductor 25. This resulting impulse of current flow over the conductor 25 initiates the timing of a weighing cycle that is ultimately completed a predetermined time after the impulse is first sent over the wire 25, as will be later explained. The truck of the car continues to move along the weigh bridge until the foremost wheel of the truck actuates the track switch 4, thus momentarily placing ground through the contact 5c of the switch 5 upon the conductor 27, thus causing operation of a marginal overspeed relay Rc. This operation is momentary, and subsequent to the release of read command relay Ra1 by a time determined by the speed of the car on the track 1f. This overspeed relay controls a signal to indicate if the car speed is approaching the maximum speed for accurate weighing, as will be described hereafter. A moment later, the foremost wheel of the truck reaches the insulated track section 1g and through the contact 5d of the switch 5 places ground upon the conductor 31 and causes operation of an error overspeed relay Rd. This relay, upon operation, places ground potential upon conductor 33. The times when the relays Rc and Rd operate are measured in relation to the time when the relay Ra releases in order to determine if there has been an overspeed or if there has been an approach to an overspeed, as will be more fully described hereafter. The marginal overspeed relay Rc operates repeatedly as the switch 4 is actuated repeatedly by the successive wheels. The error overspeed relay Rd operates only so long as there is a wheel on the insulated track section 1g, which means a single operation for each set of wheels of each car truck that has just come off of the weigh bridge.

The fact that the one or more wheels of a car truck are still on the insulated rail 1g does not in any way influence the operation of the read common relay Ra when the foremost wheel of a following truck reaches the insulated rail section 1d.

Each of the conductors 25, 32 and 33 has a desensitizing network 20 between it and ground. Each desensitizing network includes a resistance 20a of a value of the order of 120 ohms and the two condensers 20b and 20c of a value, in this instance, of .002 microfarad and .003 microfarad, respectively, and a third condenser 20d of 50 microfarads. The desensitizing networks are for the purpose of eliminating any possibility of a false signal being induced in the corresponding conductors due to extraneous noises or to extraneous electromagnetic or electrostatic fields. In addition, the conductors 25 and 33 are provided with manually operable grounding test switches 25a and 33a, respectively, to permit performance of a read test and an error test if desired.

*Computer circuitry*

When the read command relay Ra releases and recloses its contact Ra2, placing ground potential on conductor 25, a "read" pulse is generated at the input of the "read" logic circuit 39. The "read" logic circuit generates pulses on output pulse conductors 40 and 41 and a gating signal on conductor 42. The signal on conductor 40 resets a digital clock 43 to a preset count value. The clock has six cascaded decade counting units. The signal on conductor 41 is fed to a reset logic circuit 44. The signal on conductor 42 is fed to a gate amplifier and logic circuit 45. Because of a pulse on conductor 41 at the input of the reset logic circuit 44, the "reset" logic circuit generates a pulse on conductor 46, which simultaneously appears on conductors 47, 48 and 49. A polarity sensing device 114 prevents the pulse from appearing on conductors 109, 110 and 111. The pulse on conductor 47 resets the digital counter 52 to zero. The pulse on conductor 48 resets the "marginal overspeed" logic circuit 50. The pulse on conductor 49 resets the "error" logic circuit 51. Initiated by the pulse on conductor 40, the digital clock 43 starts from its preset count, counts to its maximum value, spills over, resets to zero and initiates a "start" pulse on conductor 53. The "start" pulse on conductor 53 in coincidence with a signal on conductor 42 causes the gate amplifier logic circuit 45 to open a gate circuit allowing pulses on conductor 54 from the analog to digital converter to appear on conductor 55. The counter 52 now begins to count the pulses on conductors 55. The counter 52 consists of five cascaded decade counting units 301 through 305. The count is visually indicated. A cable 66 from the output sides of the five decade counters leads to and controls a print-out device which, upon receipt of a "print" command, prints out the values recorded thereon on a tape and advances the tape one step. This advance takes place each time a print command impulse is received. The opening gate of the gate amplifier 45 generates a gate signal on conductor 65, which simultaneously appears on conductors 61, 63 and 64. When the digital clock 43 counts from zero up to a preset value determined by coincidence with preset switches, a stop signal appears on conductor 60. The stop signal on conductor 60 resets the gate amplified 45. Reset of the gate amplifier 45 closes the gate which cuts off the input from conductor 54 and removes the pulses from conductor 55. Because of the absence of pulses on conductor 55, the counter 52 stops counting. Closing of the gate in the gate amplifier 45 removes the gate signal on conductor 65 and connected conductors 61, 63 and 64. Removal of the gate signal from conductor 61 resets the read logic circuit 39. Removal of the gate signal on conductor 63 closes an "and" gate in the "error" logic circuit 51. Removal of the gate signal from conductor 64 closes an "and" gate in the "marginal overspeed" logic circuit 50.

The number of pulses counted by the counter 52 is displayed by a standard method of visual readout and may also be transferred by conductors of cable 66 to some type of a print-out device. Reset of the gate amplifier 45 because of a signal on conductor 60, also generates a pulse on conductors 56 and 57. When the computer is set to read after every count cycle single mode, the pulse on conductor 57 passes through the mode switch 72 and appears on conductor 59 as a print command on every count cycle. This signal is utilized by a print-out device as a command to print. When the computer is set to read after every second count, dual mode, the pulse on conductor 56 goes to the reset logic circuit 44 which contains a pulse counter. The pulse counter has a maximum count of two. The pulse counter generates a print command on every second "read" cycle only. The pulse counter also allows the reset logic to generate a reset pulse only after every second count cycle. Generating a reset pulse only after every second count allows the digital counter to add the second count reading to the first count reading.

*Marginal overspeed*

As explained previously, closure of track switch 4 generates a pulse on marginal overspeed pulse conductor 32 that connects to a marginal overspeed logic circuit 50. If this pulse arrives at 50 in coincidence with the gate signal on conductor 64, which occurs during a weigh cycle, an output signal is generated on conductor 69. An output signal of opposite polarity will appear on conductor 70 at the same time. The signal on conductor 69 appears on conductor 73 which is the input of an "and" circuit 79. The signal on conductor 70 appears on conductor 74 which is the input to an "and" circuit 80. A key signal arrives on conductor 81 from the print-out device. This signal is generated by the print-out device and is generated for every weigh cycle when the computer is set to single mode and on every second weigh cycle when the computer is set to dual mode. If the signal on conductor 73 and on conductor 81 are in coincidence at the input of the "and" circuit 79, an output signal will be generated on conductor 76. If the signals on conductor 73 and conductor 81 are in coincidence, then the signals on conductors 74 and 81 are not in coincidence and there is no output from the "and" circuit 80 and therefore no signal on conductor 77. If there is no coincidence of signals on conductors 73 and 81 there will be coincidence at the input of "and" circuit 80 and there will be an output on conductor 77. If relays 10, 11, 12 and 13 are not energized, an electrical circuit is completed from the 110 volt AC on conductor 86, through the back contacts 11a, 10a and 12a, through green light 15, to the AC common ground 86'. The green light 15 will be lit and serves as a signal to indicate the alarm system is on, operative, but not triggered and that marginal overspeed and overspeed have not been exceeded. If a marginal overspeed signal is present on conductor 76 the relay 12 is energized and moves its switch contacts 12a, 12b and 12c to their alternate positions. A holding circuit for the winding of relay 12 is completed by its movable contact 12c and the back contact 11c to ground at 87, and relay 12 is held energized. The closure of contacts 12b does not affect anything because there is no signal on conductor 77. Energizing relay 12 causes its blade 12a to open the circuit for the green light 15, and applies the 110 volt AC to conductor 90. This completes a circuit through the yellow light 16, and through the back contact 13a of the relay 13 completes a circuit through motor 14, via conductor 98 to AC common ground 86'. This turns on motor 14 causing the cam 19 to turn. The rotating cam opens and closes flasher contacts 20 as long as the motor is operating. The flasher contacts 20 are connected by conductor 93 and the normally closed relay contacts 13c and conductors 94 and 95, with the horn 18. This activates the horn intermittently. The steady yellow light and intermittent horn indicate that marginal overspeed has been exceeded.

When a reset pulse is generated on conductor 48 by the reset logic circuit 44, the marginal overspeed circuit 50 is reset and a signal appears on conductor 70 that connects with 74 (FIG. 2). The signals on conductors 69 and 73 are removed. Relay 12 is not affected by the removal of the signal on conductor 73 due to its self holding circuit. If marginal overspeed still exists on the next weigh cycle, another signal is generated on conductor 69 that connects with 73. Coincidence of this signal with the key signal on conductor 81 from the print out device causes "and" circuit 79 to ground on conductor 76. Relay 12 is still energized and the marginal overspeed signals continue to be activated. The next reset pulse from the reset circuit 44 which appears on conductor 48 will again reset the marginal overspeed circuit 50. If the speed of the train is reduced to below marginal overspeed at this time, there will be no longer coincidence between the pulse on conductor 48 and the gate signal on conductor 64. There will be no signal on conductors 69 and 73. Therefore, conductors 70 and 74 will have signals. When a key signal from the print out device appears on conductor 81, there is coincidence at the input of "and" circuit 80 and a signal will appear on conductor 77. Relay 12 is still energized from a previous marginal overspeed indication. The signal on conductor 77 feeds through conductor 90 and operated contacts 11a, 11b and 11c to their alternate positions. This removes 110 v. AC from the signal indication circuits turning off the horn 96, yellow light 97, and the flasher motor 14. Energizing relay 11 opens the holding circuit for relay 12, which de-energizes and thus opens the connection from conductor 77 to conductor 99 and thus opens the operating circuit for relay 11 which de-energizes. The electrical circuit for the green light 15 is now reestablished from 110 v. AC through conductor 86, through the restored contacts of the relay 11, 12 and 10 to conductor 83, through green light 15, to AC common 86; the green light 15 indicates speed has been reduced and it is safe to continue weighing.

*Error*

As explained in a previous section, triggering of track switch 4 by a wheel of a car truck triggers relay Rc generating a marginal overspeed signal on conductor 32. As the wheel and axle combination roll onto the insulated track section 1g an error, signal is generated by relay Rd on conductor 33 which is the input of the error logic circuit 51. If this signal arrives at the "error" circuit 51 in coincidence with the gate signal on conductor 63, an output signal from the "error" circuit 51 will appear on conductor 71 which connects with the conductor 75. When a keying signal appears on conductor 81 from the print-out device coincident with a signal to the "and" gate 83, that generates a signal on conductor 78. This signal is used by the print-out device to indicate an error. There will also be coincidence at the input of "and" gate 82 which generates an output signal on conductor 101. A signal on conductor 101, energizes relay 10 and relay 13 through conductor 103 (the operating windings of which are in parallel). Energized relay 10 completes a holding circuit for itself and relay 13 from ground at 87. Another electrical circuit is completed from ground at conductor 87 to conductor 103 to operate relay 13 and back contact 11b. Energized relay 10 completes a connection from conductor 85 to conductor 106. The connection from conductor 84 to conductor 85 is opened at 10a. Energized relays 10 and 13 complete a connection to horn 18 and motor 14. The horn will blow steadily, and the motor will turn the cam 20. The opening and closing of cam contacts 20 causes the red light 17 to flash on and off, said light being now connected through the flasher contacts 20 and the operated contact 13c, between the conductor 81 and the now live conductor 92. The steady horn 18 and flashing red light 17 indicate an overspeed condition exists. The green light 15 and the yellow light 16 are out because their circuits are opened by the operated contacts 10a and 12a respectively.

Switch 21 is the alarm on-off switch. Closing switch 21 completes a circuit for the operating winding of relay 11 to the power supply and energizes relay 11. At its open contacts 11b and 11c the relay 11 opens the holding circuits for relays 10 and 13 and those relays de-energize, resetting the alarm relay circuit. At the now opened contacts 11a the connection from conductor 86 to conductor 85 is broken, thus removing 110 v. AC from the entire signal system. Opening switch 21 de-energizes relay 11 and completes the connection from conductor 86 to conductor 85. De-energizing relay 10 completes the connection from conductor 85 to conductor 84. The green light 15 turns on and this indicates the alarm relay circuit is reset and on.

*Manual reset*

If switch 115 is opened, automatic reset will not take place. Opening conductor 115 prevents the reset logic circuit from generating reset pulses automatically. The counter will then add each count to the previous contained count and will continue to do so until reset. Switch 117 is a manual reset switch used to generate a reset pulse manually. Depressing switch 117 connects conductor 112 to a manual reset signal source. A reset signal on conductor 112 will appear on conductor 111, conductor 110, and conductor 109. The signal will also feed through the polarity sensing device 114 and appear on conductors 47, 48 and 49. The signal on conductor 111 resets the gate amplifier 45. The signal on conductor 109 resets the read circuit 39. The signal on 48 resets the marginal overspeed circuit 50. The signal on conductor 49 resets the error circuits 51. The signal on conductor 47 resets the counter 52. Manual reset 117 can be triggered at any time.

The read logic circuitry 39, the reset circuitry 44, the marginal overspeed circuitry 50 and the error circuitry 51, each comprise identical assemblies mounted on separate boards or cards and terminating in series of terminal plug-in type connectors whereby the logic board or card may be plugged into a switchboard where connections are made to the respective terminals and through them to the components on the board or card. By having different external connections to or between the different plugs the behavior of the circuitry is correspondingly changed. The gate amplifier 45 likewise is an assembly of electrical components having a number of plug type terminals whereby connections may be made to the components of the assembly by merely plugging the assembly into a switchboard, so that the functioning of the circuitry is determined by the connections that are made to the respective plug terminals at the switchboard. The plugs of the units 39, 44, 50 and 51 have been designated by letters of the alphabet, the same letter in each case designating the same terminal in the assemblies of FIG. 2, and in the corresponding detail circuits of FIGS. 3–4, and the connections shown are the connections made to the respective terminals.

In the respective circuitry which will be presently described, the values of the capacitors are given in micro-microfarads. All diodes are of the type known as "IN34AS." All transistors are the "2N404" type.

A description will now be given of the circuitry in the block diagrams heretofore described.

*Read card circuitry description*

The read logic card 39 is illustrated in FIG. 3. At the left hand side of the figure are shown the various terminal plugs, each bearing a designated capital letter within a circle to facilitate description. Corresponding letters designate the same terminals in FIG. 2 and FIG. 3. The read card 39 includes an inhibitor 150 which is the circuitry to the left of the line 151, a monostable multivibrator 152 (MoMV) between the lines 151 and 153; an inverter 154 between the lines 153 and 155; another inverter 156 between the lines 155 and 157 and a flip-flop circuit 158, otherwise known as a bistable multivibrator (BiMV).

In the stable state with no signals applied, the condition of the circuit is as follows:

Q1 through Q7 are transistors. Input terminal E is biased negative by the divider action of two 10K ohm resistors, 160–161 (K stands for "thousand") connected from the —11 v. line terminal K to ground; transistor Q2 of the monostable multivibrator is held "off" by the positive voltage on the base terminal provided by the +5.6 v. supply connected to input terminal U; transistor Q1 the other stage of the monostable multivibrator 152 is clamped "on" by the base current through an 18K ohm resistor 162 connected to the —11 v. line at terminal K; transistor Q3 is held "off" by the bias provided from the —20 v. supply connected to terminal F; transistor Q4 is held "off" by a bias voltage from a 27K ohm resistor 163 connected to terminal U; transistor Q5 is held "off" by the 5.6 v. bias on terminal U; transistor Q6 is held "on" by the base connection to a voltage divider made up of a 7.5K ohm and 1K ohm resistor 164 and 165 respectively, connected to the —11 v. supply at terminal K. The reference for all voltages is terminal T. A read command caused by a closure of contact Ra2 (FIG. 1) abruptly changes the voltage on wire 25 (FIG. 1) which is connected to terminal E, from approximately —5.5 v. to zero. This is a positive step voltage. This positive step is differentiated into a positive pulse by the network made up of the 220 mmfd. capacitor 166 and a 4.7K ohm resistor 167 connected to the anode of a coupling diode 168. The positive pulse is coupled by the diode to the base of transistor Q1. This drives the transistor "off" and triggers the monostable multivibrator 152. The multivibrator 152 generates a very short time duration positive pulse which is coupled by a diode 169 to terminal L. This pulse from L is used to "trigger" the reset logic card 44. This pulse is coupled to transistor Q3 where it is inverted and appears at the collector of Q3 as a negative pulse. This negative pulse appears at terminals H and D and serves as a reset pulse for the digital clock 43. This negative pulse also appears at the input of transistor Q4 where it is again inverted and appears on the collector of Q4 as a positive pulse. This positive pulse appears at terminal N and also at terminal P through the external connection 170 between these terminals. At terminal P the pulse is differentiated by a network consisting of a 220 mmfd. capacitor 172 and a 10K ohm resistor 173 into a positive and a negative peaked wave form. The positive peak is coupled by a diode 174 connected to the base of transistor Q6. The negative portion does not pass through this diode. The positive peaked pulse triggers the bistable multivibrator (flip-flop) 158. When the flip-flop is triggered Q6 is turned off and Q5 is turned on. When Q6 is turned off the collector voltage changes from ground potential to approximately −11 v. This negative step is coupled through a 4.7K resistor 176 to terminal M. At terminal M the negative step is connected to terminal A by a wire 177 (at the switchboard) and then coupled through a 4.7K ohm resistor 167 to the anode of the diode connected to the base of Q1. This negative step on the diode biases the diode so that no trigger pulses can get into the input of the circuit. The network at the base terminal of Q1 is an inhibitor circuit and the negative step from the collector of Q6 is the inhibiting signal.

When the bistable MV158 is triggered a positive step is generated at the collector of Q5 when it turns off. This positive step is coupled through a 4.7K ohm resistor 180 and appears at terminal S. This positive step at terminal S is fed to the gate amplifier 45 (terminal R of FIG. 2) and serves as an enabling gate voltage. The gate amplifier generates a negative step voltage at its terminal R. This negative step is differentiated into a negative pulse by a network consisting of a 220 mmfd. capacitor 182 and 10K ohm resistor 183. The negative pulse is ignored by the flip-flop due to the diode.

After a time period determined by the digital clock and the gate amplifier a positive step appears at terminal R from conductor 65. The positive step is differentiated into a positive pulse by a network consisting of a capacitor 182 and the resistor 183. This positive pulse resets the multivibrator 158 by turning off transistor Q5. The turn off of Q5 generates a negative step on the collector of Q5, which step is coupled through resistor 180 to terminal S. This negative step serves as an inhibit signal for the gate amplifier.

The turning off of transistor Q5 drives Q6 "on." The turn-on of Q6 generates a positive step voltage at the collector of Q6. The positive step is coupled through a resistor 176 to terminal M and then to terminal A. The positive step removes the bias on the diode at the base of Q1 and allows it to once again pass "read" signals.

The flip-flop 158 is manually reset by a signal at terminal V from conductor 109. The negative step is applied to the base of Q6 through the resistor 176. If Q6 is "off" the negative step will turn Q6 on. If Q6 is already "on" the negative step will be ignored.

*Reset card circuit description*

As previously stated the reset card is the same circuit as the circuit of FIG. 3, differing therefrom only in that the external connections to the various terminals are different. The connections to the terminals are as indicated in FIG. 2. There are no terminals L and C on the illustration of the reset card 44 in FIG. 2. They have been omitted from the drawing because they are not used in the reset card circuit. To produce the reset circuit 44 the connections to the circuitry of FIG. 3 are as indicated in FIG. 2, namely, the E terminal of 44 (FIG. 2) is connected by a conductor 200 and the reset switch 115 to the conductor 41 that leads to the L terminal of the read circuit 39. The S terminal of 44 is connected by conductor 58 to the dual terminal 204 of a switch 205, the blade 206 of which connects with the conductor 59 that leads to the print out terminal 39 of the switchboard. Another blade 207 of the same mechanical switch connects the terminal A of 44 selectively to the terminal M thereof or to the ground. The switch blades 206 and 207 are mechanically interconnected by a link 210 for joint operation. The terminals P, R and N are inter-connected by a connecting wire 212. The D terminal of 44 is connected to the print command conductor 57. The V terminal of 44 is connected to conductor 110. The F terminal is connected to a −20 volt source of direct voltage. The terminal K is connected to a −11 volt source of direct voltage. Terminal U is connected to a +5.6 volt source of direct voltage. The terminal T of 44 is connected to ground.

The operation of the reset card circuit 44 when read on a combination of FIG. 2 and FIG. 3 is as follows:

Before a weigh cycle begins (single or dual mode operation) a negative step voltage is generated manually at terminal V. This voltage is coupled through a 4.7K ohm resistor to the base of transistor Q6. This is to insure that transistor Q6 is forced to conduct. Conduction of Q6 insures cutoff of transistor Q5.

At the beginning of a weigh cycle, no signals applied, the condition of the circuit is as follows:

Transistor Q2 is off due to the positive bias applied to the base through a 27K ohm resistor from a −5.6 volt supply connected to terminal U; transistor Q1 is "on" due to the negative bias on the base applied through an 18K ohm resistor from a −11 volt supply connected to terminal K; transistor Q3 is off due to the negative bias applied to its base through a 27K ohm resistor from a −20 v. supply connected to terminal F; transistor Q4 is "on" due to a negative potential applied at terminal D by the gate amplifier; Q6 is conducting due to the manual reset signal applied to terminal V; Q5 is "off" because Q6 is conducting. All voltages are referred to ground terminal T.

*Single mode operation (truck weight)*

For single mode operation the mode switch is in the position of the dotted lines. Terminal A is grounded and the print command signal is issued from the gate amplifier to the printer.

At the beginning of the weigh cycle a pulse is issued by the read card at terminal E. The positive pulse is differentiated by a 220 mmfd. capacitor and a 10K ohm resistor into a positive peaked pulse and a negative peaked pulse. The positive peaked pulse is fed through the diode D1 and appears on the base of Q1 turning it off. Turn off of Q1 triggers the monostable multivibrator. The negative peaked pulse cannot pass through the diode and therefore it is ignored by the MV. Triggering of the monostable multivibrator causes the generation of a very short time duration positive pulse on the collector of Q2. The positive pulse is coupled to the base of Q3 and the pulse appears as a negative pulse on the collector of Q3. The negative pulse is coupled to terminal H and serves as a reset pulse for the error card, marginal overspeed card, and decade counting units. Because terminal A is grounded, a reset pulse will be issued at terminal H for every auto reset pulse coming in at terminal E from the read card. A print command signal appears on terminal D from the gate amplifier for each weigh cycle. The signal is a positive step at the beginning of the count cycle followed by a negative step at the end of the count cycle. This signal is coupled to the base of transistor Q4 and appears on the collector of Q4 as a negative step followed by a positive step. This signal activates the bistable multivibrator. The output terminals S and M of the multivibrator are not connected to anything when in single mode; therefore, there is no need to consider the action of the multivibrator at this time.

*Dual mode operation (car weights)*

For dual mode operation, the mode switch is in the position shown by the solid lines. With no signals applied before a weighing operation the condition of the circuit is as described in the first part of the circuit description.

An auto reset pulse issued by the read card is coupled to terminal E. The pulse is differentiated by a network made up of a 220 mmfd. capacitor and a 4.7K ohm resistor into a positive peaked pulse and a negative peaked pulse. The voltage at terminal A is approximately 0 volt due to conducting Q6. The positive peaked pulse feeds through diode D1 and appears at the base of Q1 driving it positive and triggering the monostable multivibrator. The negative peaked pulse will not feed through the diode D1 so it does not affect the multivibrator. Triggering the multivibrator generates a short time duration positive pulse on the collector of Q2. The pulse is coupled to the base of Q3 and appears on the collector of Q3 as a negative pulse. The pulse is then coupled to terminal H and serves as a reset pulse for the decade counting unit, marginal overspeed card, and error card. After the reset pulse is generated by the read card during the weigh cycle, a print command signal is generated by the gate amplifier at terminal D. The signal is a positive step followed by a negative step. The signal is coupled to the base of Q4 and appears at the collector of Q4 as a negative step followed by a positive step voltage. The signal is coupled to terminal N and then to R and P. After terminal R the signal is differentiated into a negative peaked pulse followed by a positive peaked pulse by a 220 mmfd. capacitor and a 10K ohm resistor. The negative pulse is ignored because of the diode D2. After termination P the signal is differentiated by a 220 mmfd. capacitor and a 10K ohm resistor. The negative pulse is ignored because of the diode D3.

Because Q6 is conducting, the positive peaked pulse is coupled through diode D3 and appears at the base of Q6 turning it off. The pulse at diode D2 does nothing because Q5 was already off. Turning "off" Q6 turns on Q5. Turning off Q6 causes the collector of Q6 to change from an 0 volt potential to approximately −11 volts. The −11 volt potential is coupled through a 4.7K ohm resistor, through the mode switch, to terminal A. The collector of Q6 changes from approximately −11 volts to 0 volt potential. This change is coupled to terminal S through a 4.7K ohm resistor. From terminal S the signal is coupled through the mode switch to the printer and serves as a print command signal. This positive step is ignored by the printer because the printer will react only on negative changes.

The next reset pulse is generated by the read card on the next weigh cycle and the pulse is fed to terminal E. The pulse does not get through the coupling circuit to the anode of D1 because of the negative voltage applied to D1 through a 4.7K ohm resistor. The negative voltage originates at the collector of Q6. The result is that no reset pulse will be issued at terminal H for the second weigh cycle. Another print command will be generated at terminal D by the second read cycle. The signal is inverted by transistor Q4 and applied to the bistable through terminals N, R and P. This signal is once again differentiated into negative peaked pulses followed by positive peaked pulses and applied to diodes D2 and D3. The negative peaked pulses are ignored by the diodes. The positive peaked pulses are applied to transistors Q4 and Q6. The pulse fed to the base of Q6 is ignored because Q6 is "off." The pulse fed to diode D2 turns "off" Q5 and triggers the multivibrator. The collector of Q5 changes from 0 volts to −11 volts and is coupled to terminal S through a 4.7K ohm resistor. From terminal S, the negative step is coupled through the mode switch to the printer and serves as a print command. The printer will now react to the negative voltage change. Triggering of the bistable at this point also causes the collector of Q6 to change from approximately −11 volts to 0 volt. This change is coupled to terminal M through a 4.7K resistor then through the mode switch to terminal A. This removes the negative bias from the anode of D1 and allows the next reset pulse to feed through diode D1.

*Error card circuit description*

As previously stated, the error card contains the same electronic units connected to the respective terminals of the card in the same way as in FIG. 4. The difference between the error circuitry and the "read" circuit of FIG. 3 lies in the external connections, as indicated in FIG. 2. In the case of the error circuitry 51 the H and D terminals which are connected together by a conductor 220 (as in the case of the "read" circuitry 39) are in turn not connected to the conductor 40. The N and P conductors are, in both instances, interconnected by a conductor 221. In the error circuitry 51 the A terminal is connected to ground by a conductor 222. The E terminal is connected to the error impulse conductor 33 and the M terminal is connected to the error print out at the printer by the conductor 75. An impulse coming to the printer from this conductor actuates the printer to print E, or some other symbol indicative of error. The conductor 49 from the reset card (FIG. 3) leads to the V terminal.

In the stable state with no signals applied the circuit conditions are as follows:

Input terminal E is biased at −5.5 v. because of the divider action of the two 10K ohm resistors connected from the −11 v. supply at terminal K to ground terminal T; the transistor QZ is "off" because of the bias from the +5.6 v. supply, connected to terminal U applied through the 27K ohm resistor connected to the base of Q2; transistor Q1 is clamped "on" because of base current through an 18K ohm resistor connected to the −11 v. supply at terminal F applied through the 27K resistor; transistor Q4 is off due to bias from the +5.6 v. supply at terminal U applied through a 27K ohm resistor connected to the base of Q4; the junction of the 3.3K and 1.8K ohm resistor is clamped at ground by the diode D1 connected to terminal C and an *ov* signal from the gate amplifier card, the bistable MV has transistor Q6 conducting and Q5 cutoff. This is the normal state of the MV with no signals applied.

All voltages are referred to ground terminal T. An error signal is generated at terminal E by a contact closure. Contact closure shorts terminal E to ground generating a positive step of 5.5 volts. The positive step is differentiated into a positive pulse by a network consisting of a 220 mmfd. capacitor and a 4.7K ohm resistor and applied to the anode of a diode connected to the base of transistor Q1. The positive pulse turns off transistor Q1 and triggers the monostable MV. The monostable MV generates a positive pulse at the collector of Q2 of short time duration. The positive pulse is coupled to the transistor Q3 and is inverted. The pulse appears on the collector of Q3 as a negative pulse. The negative pulse is coupled through terminals H and D to appear at the junction of a 3.3K ohm and a 1.8K ohm resistor in the base circuit of transistor Q4. If the pulse arrives at this junction when the voltage at terminal C is 0 volt the pulse will not affect transistor Q4 because of the clamping action of the diode D1 and the 0 volt bias at the junction. If the pulse does not get through Q4, nothing further happens.

The voltage at terminal C changes from 0 volt to approximately −11 volts when a count cycle starts and remains at 11 v. during the count cycle. If an error input at E occurs after a count cycle ends, the error signal ends at the input of transistor Q4. If an error signal occurs at E during a count cycle, the voltage at terminal C will be at −11 v. When this occurs, the anode of diode D1 will be biased negative and therefore it will be cut off. The cut off diode D1 will no longer hold the junction of the 3.3K ohm resistor and the 1.8K ohm resistor at the input of transistor Q4 at ground (0 volt) potential. The negative pulse output of transistor Q3 will now be coupled to the base of transistor Q4. The transistor Q4 will invert the pulse and cause it to appear at the collector terminal of Q4. The inverted pulse which is now a positive pulse will be coupled through terminals N and P to the input terminal of a bistable multivibrator. The pulse will be differentiated by a network consisting of a 220 mmfd. capacitor and a 10K ohm resistor into a positive peaked pulse and a negative peaked pulse at the anode of diode D2. The positive peaked pulse triggers the flip-flop, by driving the base of Q6 in a positive direction and cutting it off. Cutting off Q6 turns on Q5. The negative portion of the peaked pulse at the anode of D2 is ignored by the diode. Triggering the flip-flop causes the collector of Q6 to change from approximately 0 volt to approximately −11 volts. This action causes the output terminal M to go through approximately the same change. The change at terminal M is the output signal of the error card and is the signal used to trigger error indicating devices. The error card is reset by means of a negative pulse at terminal V generated by the reset cord. This pulse is generated by the reset cord at the beginning of every weigh cycle to insure that the bistable is set to Q5 cutoff and Q6 on at the beginning of every weigh cycle.

*Marginal overspeed*

The marginal overspeed circuitry is, as previously stated, identical with the error circuitry. It receives its initiating impulses over the conductor 32, as previously stated, and delivers its output to the conductors 69 and 70 that are connected through the switchboard to the "and" gates 79 and 80 of FIG. 1A.

If the marginal overspeed unit is entirely omitted, then the S terminal of the error logic card 51 is connected to the "and" gate 80 at the conductor 74 thereof and nothing is connected to the "and" gate 79. Under those circumstances, of course, there is no marginal overspeed signal, and the equipment for giving such signal is omitted.

*Gate amplifier circuit*

The gate amplifier circuit is illustrated in FIG. 4. The reference numerals thereon are the same as were heretofore used for similar parts thereof. The gate amplifier includes inverters 154A and 165A, similar to those of FIG. 3, a bistable multivibrator 158 and "and" circuit 240 and another inverter 156B.

At terminal V a negative voltage step is generated manually and applied to the base of transistor Q4. This negative step forces Q4 to be in a conducting state. Conducting Q4 insures a cut off of transistor Q3.

The stable state of the circuit with no signals applied is as follows:

Transistor Q1 is "off" due to the +5.6 volt bias applied through a 33K ohm resistor connected to terminal U; transistor Q2 is "on" due to the −11 volt bias at terminal K applied through a 2.2K ohm resistor and a 4.7K ohm resistor connected to the base of Q2; transistor Q4 is on since it was made to conduct by a manual reset signal and it is held "on" by the negative bias applied by the −11 volt supply at terminal K; transistor Q3 is "off" because Q4 is "on" and it is held "off" by +5.6 volt bias at terminal U applied through a 27K ohm resistor to its base; transistor Q5 is "off" due to the +5.6 volt bias at terminal U applied through a 33K ohm resistor to its base; transistor Q6 is "off" because Q5 in its emitter circuit is "off"; transistor Q7 is part of a normal inverting amplifier and is always in a conducting state. Positive pulses are being applied to terminal L by an analog-to-digital converter and coupled to the base of Q7 by a 0.1 mfd. capacitor. The positive pulses are amplified and inverted by Q7 and applied to the base of Q6. The pulses cannot pass through Q6 because Q6 is held in an "off" condition as previously explained.

At an instant of time determined by the digital clock a positive step voltage is applied to terminal P. The positive step is differentiated into a positive peaked voltage by a 220 mmfd. capacitor and a 4.7K ohm resistor and applied to the anode of diode D1. If a weigh cycle has started, the voltage at terminal R will have previously changed from approximately −11 volts to approximately 0 volt. If the voltage at R is −11 volts the anode of D1 is biased negative and the positive peaked pulse will not pass through the diode. If a weigh cycle has begun, the voltage at terminal R will be approximately 0 volt and the positive peaked pulse will feed through diode D1 and will be applied to the base of Q4. The positive pulse on the base of Q4 turns it "off" and turns "on" Q3. Turn off of Q4 makes its collector voltage swing negative by approximately −11 volts. This change is coupled to the base of transistor Q5 and turns it "on." Turn on of transistor Q5 completes the emitter circuit for Q6. This allows Q6 to conduct. The negative pulses being applied to the base of Q6 are now inverted and appear as positive pulses on the collector of Q6. The pulses are coupled to terminal N and then fed to a counter.

The negative voltage step on the collector of Q4 is also coupled to terminal M and is fed to the read card, error card, and marginal overspeed card as a gate signal to show that a "count" cycle has begun.

The negative step which has been generated by the digital clock at terminal E is coupled to the base of Q1 and appears at the collector as a positive step. The positive step is coupled to the base of Q2 and appears at the collector as a negative step. The negative step is differentiated by a 220 mmfd. capacitor and a 10K ohm resistor into a negative peaked pulse. The negative peaked pulse is applied to the anode of diode D2 but it cannot get through the diode so the negative peaked pulse is ignored by the circuit.

At the end of the count cycle, as determined by the digital clock, a positive step is generated at terminal E. The positive step turns off transistor Q1 causing the collector voltage of Q1 to change from approximately 0 volt to approximately −11 volts. This negative step is coupled to Q2 causing it to turn "on." Turn on of Q2 causes its collector to change from approximately −11 volts to approximately 0 volt. This positive step is differentiated into a positive peaked pulse by a 220 mmfd. capacitor and a 10K ohm resistor. The positive peaked pulse is coupled by diode D1 to the base of Q3 forcing Q3 to turn off and triggering the bistable multivibrator. Q3 turning off generates a negative step on the collector of Q3. This negative step voltage is coupled to terminal S and then is coupled direct to the printer for single mode or to the reset car for dual mode. This negative step is the print command which tells the printer to print.

When Q3 turns off, Q4 turns on. Turn on of Q4 generates a positive step on the collector of Q4. The positive step is coupled to the base of Q5 and turns Q5 off. Turn off of Q5 opens the emitter circuit of Q6 and turns off Q6. Turn off of Q6 removes the pulses from terminal N. The positive step on the collector of Q4 is also coupled to terminal M and serves as a signal to the read card, error card, and the marginal overspeed card that the read cycle has been completed. Also an inhibit signal, a negative step voltage, is issued from the read card to terminal R. This negative step voltage is applied to the anode of D1 and biases it negative to cut off start pulses from the clock until a weigh cycle is started at the read card.

In compliance with the requirements of the patent statutes I have herein shown and described a preferred embodiment of the invention. It is, however, to be understood that the invention is not limited to the precise construction and circuitry herein shown, the same being merely illustrative of the principles of the invention. What is considered new and sought to be secured by Letters Patent is:

1. In a system wherein railroad cars are moved through a weighing station and weighed in motion, and wherein a recorder is successively advanced to make separate recordings of the respective car weights, and wherein the speed of each car through the weighing station is tested to determine if the speed is so improper that it may excessively affect the weighing accuracy, the method which comprises nullifying the weighing effects with respect to those cars that pass through the weighing station at improper speeds but advancing the recorder notwithstanding the nullifying action so that by the successive advances the records will indicate which cars pass through the weighing station at an improper speed, and the respective weighing recordings of the other cars can be attributed to the appropriate cars.

2. In a system wherein railroad cars are moved through a weighing station and weighed in motion one end at a time, and wherein a recorder is successively advanced to make one or more recordings appertaining to the weight of each car, the method which comprises testing the speed of each car through the weighing station to determine if the speed during the weighing of any end of any car is so improper that it may excessively affect the weighing effects with respect to those cars that pass through the weighing station at improper speeds but advancing the recorder notwithstanding each said nullifying action so that by the successive advances the recordings will indicate which cars pass through the weighing station at an improper speed, and the respective weighing recordings of the other cars can be attributed to the appropriate cars.

3. In an electric scale for weighing moving loads wherein there is provided means for determining when the load is scale-borne, load responsive means that produce an electric signal which is a function of the static weight of the scale-borne load plus a function of the oscillations produced by the movement of the load, the method of measuring those parts of the signal which are functions of the static weight of the load, which method comprises filtering said electric signal to favor passage of those electrical characteristics that are a function of the static weight of the load and to inhibit passage of those characteristics that are produced as a result of movement of the load, producing an alternating voltage the frequency of which varies each instant as a function of the instantaneous value of said filtered product, and counting the pulses of said produced voltage over an exactly ascertained period of time but delaying the commencement of the counting for a time interval after the commencement of the filtering.

4. An electric scale for weighing moving loads, said scale including load responsive means that produce an electric signal which is a function of the static weight of the scale-borne load plus a function of the oscillations produced by the movement of the load, means for filtering said signal to favor passage of those electrical characteristics which are a function of the static weight of the load and to inhibit passage of those characteristics that are produced as a result of movement of the load, means for producing an alternating voltage of a frequency which varies at each instant as a function of the instantaneous value of said filtered product, means for counting the pulses of said produced voltage over an exactly ascertained period of time, and means for delaying the commencement of the counting operation for a time interval after the commencement of the filtering of said signal.

5. A method as in claim 3 which includes delaying the initiation of the counting of the pulses for a period of time after production of the filtered product of the last shock impact of the movement of the load onto the scale to allow for attenuation of signals of impact produced vibrations.

6. A combination as in claim 4 which includes means for postponing the initiation of the counting of the pulses for a period of time after the signal from the last shock impact of the movement of the load onto the scale has been flowing through the filter, to allow for attenuation of vibration signals produced by the load as it becomes scale borne.

7. In an electric scale for weighing moving loads wherein there is provided load responsive means that produce an electric signal which is a function of the static weight of the load plus a function of the oscillations produced by the movement of the load, the method of measuring that part of the signal which is a function of the load which comprises producing an alternating voltage the frequency of which varies each instant under control of said signal and counting the pulses of said produced voltage over an exactly ascertained period of time, but delaying the initiation of the counting of the pulses for another ascertained period of time after the filter has received the signals resulting from the last shock impact of the movement of the load onto the scale to allow for attenuation of impact produced vibrations.

8. In a system wherein railroad cars are moved through a weighing station and weighed in motion, and wherein a recorder records the respective car weights, the method which comprises testing the speed of each car through the weighing station to determine if the speed is so improper that it may excessively affect the weighing accuracy, and making recordings indicating which cars pass through the weighing station at an improper speed so that the respective weighing recordings of the other cars can be attributed to the appropriate cars.

9. In a system wherein railroad cars are moved through a weighing station and weighed in motion one part at a time, and wherein a recorder is successively advanced to make one or more recordings appertaining to the weight of each car, the method which comprises testing the speed of each car through the weighing station to determine if its speed is so improper that it may excessively affect the weighing, and nullifying the weighing effects with respect to those cars that pass through the weighing station at improper speeds but indicating each such nullifying action so that by the successive advances the recordings will indicate which cars pass through the weighing station at an improper speed, and the respective weighing recordings of the other cars can be attributed to the appropriate cars.

10. A system for weighing a series of successive railroad cars, comprising a weigh rail, first means responsive to the movement of a part of a railroad car to a predetermined position for testing whether there is a car wheel within a determined distance from the weigh rail, second means responsive to the absence of all car wheels from within said distance from the weigh rail for initiating a timing cycle and at the end of said timing cycle weighing the load on the weigh rail, third means for determining an excessive speed of the cars, and means controlled by the second and third means for recording the respective weights of the cars that were moving on the weigh rail at a non-excessive speed and making a record whereby said respective recordings can be attributed to the appropriate cars.

11. A system for weighing a series of railroad cars, comprising a weigh rail, first means responsive to the movement of a part of a railroad car to a predetermined position for initiating a cycle for weighing the load on the weigh rail by integrating the instantaneous effects of the weight on the weigh rail for an accurately measured period of time, weight recording means, and means for operating the recording means in one manner in the absence of overspeed and in another manner in the event of overspeed, thereby indicating an incipient error in the weighing operation caused by excessive speed of the cars being weighed.

12. Means for weighing each of a series of railroad cars in motion, said means comprising a weighing track section, an approach track section, an exit track section, a weight recorder, first means responsive to the removal from the approach track section of the last part of a to-be-weighed load that had been thereon for starting a first timing operation, second means responsive to the completion of the timing operation for weighing the load on the weighing section, third means responsive to an excess speed of the load on the weighing section for nullifying the effect of the weighing, and means controlled by the second and the third means for actuating the recorder in one manner or another depending upon whether the third means has or has not responded, said weighing section being of a length of the order of 12½ feet to enable the weighing of railroad freight cars coupled and in motion.

13. In a system wherein railroad cars are moved through a weighing station and weighed in motion, a weight recorder, means for sending weight signals to make separate recordings of the respective car weights, means for determining whether the speed of each car through the weighing station is so improper that it may excessively affect the weighing accuracy, and means for sending a signal to the recorder for indicating on the recording which cars pass through the weighing station at an improper speed whereby the respective weight recordings of the other cars can be attributed to the appropriate cars.

14. In a system wherein railroad cars are moved through a weighing station and weighed in motion, a weight recorder to make separate recordings of the respective car weights, means for determining whether the speed of each car through the weighing station is so improper that it may excessively affect the weighing accuracy, means for nullifying the weighing effects with respect to those cars that pass through the weighing station at improper speeds but advancing the recorder notwithstanding the nullifying action so that by the successive advances the recordings will indicate which cars pass through the weighing station at an improper speed so that the respective weight recordings of the other cars can be attributed to the appropriate cars.

15. A method of weighing each of a series of loads while in motion, comprising the steps of traversing each load to be weighed through a weighing station, weighing each load during its traverse of the weighing station, determining for each load whether the speed of traverse is so excessive that the accuracy of weighing is affected, recording the weight of each load and recording which loads, if any, traversed at excessive speed whereby the respective weight recordings can be attributed to the appropriate loads.

16. A method as claimed in claim 15, wherein a further determination of the traversing speed of each load is made to determine for each load if the speed of traverse is approaching the condition of excessive speed, whereby the speed of traverse may be reduced before reaching said excessive speed.

17. A method as defined in claim 15 wherein the weighing is effected by integrating the instantaneous effects of the weight of the load on the weighing station.

18. Apparatus for weighing each of a series of successive loads while in motion, comprising a weighing station, weighing means for weighing each load while being traversed through the weighing station, means for determining which loads, if any, traverse the weighing station at a speed which is excessive for accurate weighing by the weighing means, weight recording means, and means controlled by the weighing means and the speed determining means for actuating the recording means in one manner or another depending upon whether there was an excessive speed with respect to the particular load being weighed, so that the respective weight recordings and overspeed conditions can be attributed to the appropriate loads of the series.

19. Apparatus for weighing as claimed in claim 18 and further comprising means for detecting and indicating when the speed of traverse of a load approaches said excessive speed whereby further increase in speed of the loads can be avoided.

20. Apparatus as defined in claim 18, wherein the weighing means includes means adapted to produce an electric signal of a magnitude which is a function of the static weight of the load plus a function of the oscillations produced on movement of the load onto the weighing station, means for obtaining from said signal a further signal which is characteristic of the function of static weight, means for measuring a characteristic of said further signal for an exactly ascertained period of time.

21. Apparatus as defined in claim 20, wherein the means for obtaining the further signal comprises means for measuring that part of the first signal which is a function of the static weight and for producing an alternating voltage the frequency of which varies at each instant under the control of the first signal, means for counting the pulses of said produced voltage over said exactly ascertained time period which is a fraction of a second.

22. Apparatus as defined in claim 18, wherein the moving loads are units of railroad rolling equipment and the weighing station comprises a weigh rail section and there is provided means responsive to the movement of a part of a unit relative to a predetermined position with respect to the weigh rail section for determining when that part constitutes the whole of a unit to be weighed, and means for delaying the weighing operation for at least a predetermined period of time thereafter.

23. Apparatus as defined in claim 21, wherein the moving loads are units of railroad rolling equipment and the weighing station comprises a weigh rail section and there is provided means responsive to the movement of a part of a unit relative to a predetermined position with respect to the weigh rail section for testing if there is a wheel of a unit approaching the weigh rail, section, and located within less than a predetermined distance from that part of the unit and from the weigh rail section, means for disabling the effect of the first means if there is no unit wheel within said predetermined distance, means for maintaining said response if there is a unit wheel within said distance, and means responsive to the subsequent leaving of all of the wheels of the unit from within said distance from the weigh rail section for weighing the load on the weigh rail section.

24. Apparatus as defined in claim 18, wherein the weighing means includes means adapted to produce an electric signal of a magnitude which is a function of the static weight of the load plus a function of the oscillations produced on movement of the load onto the weighing station, means for obtaining from said signal a further signal which is characteristic of the function of static weight, means for measuring a characteristic of said further signal for an exactly ascertained period of time, and means for delaying the initiation of the measurement of said characteristic for a time period greater than said first-mentioned time period, after the last shock impact arising from the movement of the load onto the weighing station.

25. Apparatus as defined in claim 24, wherein the means for obtaining the further signal comprises means for measuring that part of the first signal which is a function of the static weight and for producing an alternating voltage the frequency of which varies at each instant under the control of the first signal, means for counting the pulses of said produced voltage over said exactly ascertained time period which is a fraction of a second, and wherein the delay means delays initiation of the pulse-counting means for a larger fraction of a second after said last shock impact.

References Cited

UNITED STATES PATENTS

| | | | |
|---|---|---|---|
| 2,083,783 | 6/1937 | Haegele | 177—134 XR |
| 2,543,794 | 3/1951 | Mayer | 177—163 |
| 2,543,806 | 3/1951 | Roeser | 177—163 |
| 2,723,844 | 11/1955 | Thurston | 177—211 XR |
| 2,914,310 | 11/1959 | Bahrs | 177—185 XR |
| 3,063,635 | 11/1962 | Gordon. | |
| 3,101,800 | 8/1963 | Raskin | 177—1 |
| 3,106,259 | 10/1963 | Bensema et al. | 177—134 XR |
| 3,192,535 | 6/1965 | Watson | 177—17 XR |

FOREIGN PATENTS

| | | |
|---|---|---|
| 1,089,238 | 9/1954 | France. |
| 926,045 | 4/1955 | Germany. |
| 1,103,041 | 3/1961 | Germany. |
| 180,451 | 8/1962 | Sweden. |

ROBERT S. WARD, JR., *Primary Examiner.*